Dec. 25, 1962
C. R. LAUBENFELS
3,069,914
TURN-LIMITING MECHANISM
Filed Dec. 23, 1960
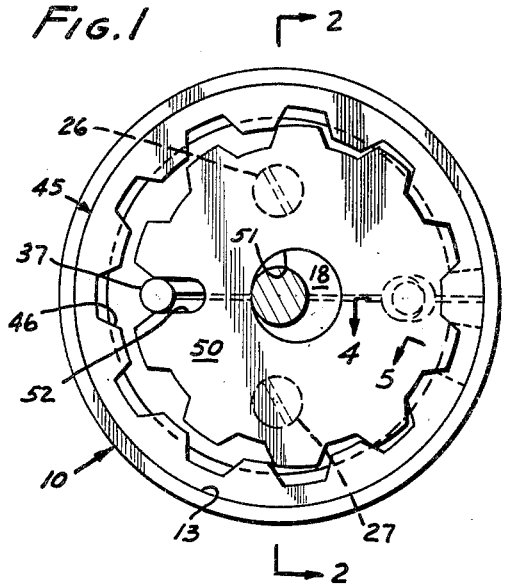
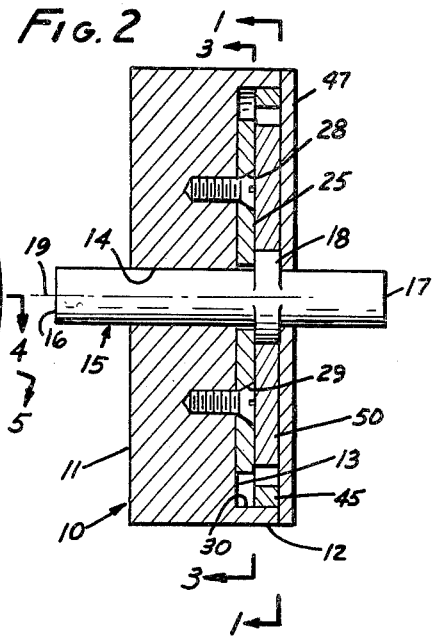
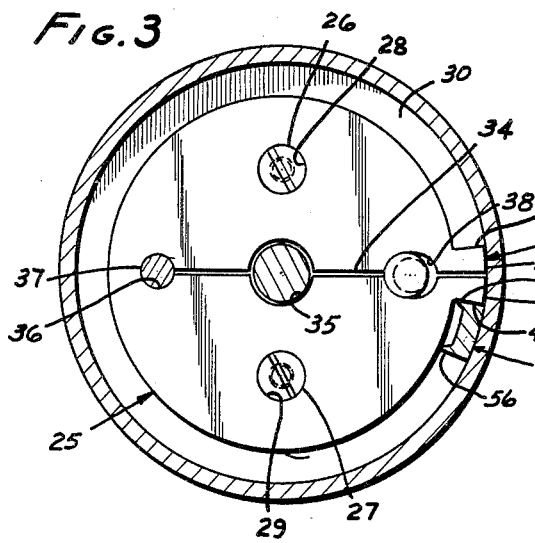
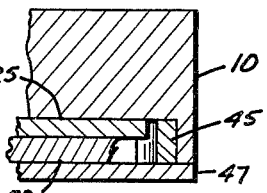
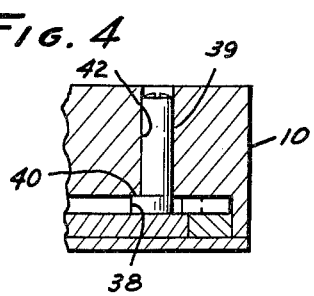
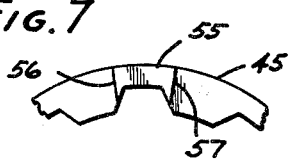
INVENTOR.
CLARENCE R. LAUBENFELS
BY Angus & Mon
ATTORNEYS.

United States Patent Office 3,069,914
Patented Dec. 25, 1962

3,069,914
TURN-LIMITING MECHANISM
Clarence R. Laubenfels, 333 Scholl Drive,
Glendale, Calif.
Filed Dec. 23, 1960, Ser. No. 77,935
4 Claims. (Cl. 74—10.2)

This invention relates to a turn-limiting mechanism for precisely limiting the rotation of a shaft to a predetermined number of degrees.

There are many applications which utilize rotational shafts wherein it is desired to turn the shaft through an exact, predetermined number of degrees. One well-known use for such a mechanism is in connection with precision potentiometers. These precision potentiometers include wire-wound coils with follower mechanisms. Rotation of the potentiometer shaft causes the follower mechanism to move along the coil, and a reading is produced which varies from an initial to a final value. In many applications, it is important that the initial and final follower positions be precisely determined; that is, that the shaft rotation be an exact number of degrees. This invention provides means for attaining this objective.

There are, of course, many devices which have been proposed to precisely limit shaft rotation. However, conventional devices tend to suffer from the fact that they invariably place stops inside the potentiometer whereby full torque continues to be applied to the shaft even while the stop is engaged. This, of course, applies torque to the potentiometer mechanism which causes distortions. The actual angular displacement is thus something other than that which was intended. Furthermore, internal stops have to be made small, and are threfore not strong enough to withstand a hard blow such as may result from suddenly stopping a rapidly turning shaft.

An object of this invention is to provide a rotation limiting stop mechanism which has the rotation limiting means dsposed between the source of power and the potentiometer itself so that there is applied to the potentiometer only the force necessary for turning it, the stop mechanism being exterior of the potentiometer device itself. Then the stop mechanism can be made strong enough to withstand strong torques and heavy blows, while the potentiometer can be made lighter and more delicate, because it need not withstand torques or blows.

A device according to this invention comprises a case having a circular gear cavity in which a ring gear having a plurality of internal teeth surrounds a smaller spur gear having exterior teeth different in number from the teeth of the ring gear. The spur gear is driven by an eccentric and is restricted to oscillatory movement by a post and slot engagement. Each oscillation serves to rotate the ring gear by a preselected angular increment. The ring gear carries a stop which is engageable with a stop in the case to determine the end points of the rotation of the ring gear.

A preferred but optional feature of the invention resides in providing the stop whose position is adjustable, thereby providing means for adjusting the total angular movement through which the ring gear can turn.

The above and other features of this invention will be fully understood from the following detailed description and the accompanying drawings in which:

FIG. 1 is a cross-section of the presently preferred embodiment taken at line 1—1 of FIG. 2;

FIG. 2 is a cross-section taken at line 2—2 of FIG. 1;

FIG. 3 is a cross-section taken at line 3—3 of FIG. 2;

FIGS. 4 and 5 are fragmentary cross-sections taken at lines 4—4 and 5—5, respectively, of FIG. 1; and FIGS. 6 and 7 are a fragmentary elevation and plan, respectively of portions of FIG. 1.

The presently preferred embodiment of turn-limiting mechanism is shown in FIGS. 1 and 2. This device includes a case 10 which has a base portion 11 and a rim portion 12. The rim portion encloses a gear cavity 13 which has a circular internal periphery which acts as a gear bearing.

A passage 14 through the base provides a shaft bearing for a drive shaft 15. The shaft has an input section 16 to which input torque may be applied, and an output section 17 which is adapted to be connected to the device whose rotation is limited by the mechanism. For example, the output section of the shaft might be connected to the shaft of a rotary potentiometer. Shaft 15 includes a circular eccentric cam 18, the center of the cam being off the central axis 19 of the shaft.

A stop plate 25 is held to the bottom of the gear cavity by two screws 26, 27 which respectively pass through counter-sunk holes 28, 29 in the stop plate. The major portion of the perimeter of the stop plate is circular and of lesser diameter than the internal diameter of the gear cavity. This arrangement leaves a groove 30 between the rim and the stop plate over the major portion of their perimeters. A stop 31 constitutes a pair of tabs 32, 33 which project from the stop plate into the groove. The stop plate has a slot 34 which separates the two tabs and extends a substantial distance into the stop plate. The stop plate also includes a first hole 35 for passing the shaft, a second hole 36 for passing a pin 37 that is mounted in the base portion at the bottom of the cavity, and an elongated cam hole 38 which has its major dimension aligned with the slot. An adjustment pin 39 having an eccentric 40 thereon is fitted in a hole 42 in the base plate (FIG. 4) so that eccentric 40 fits in cam hole 38. Turning pin 39 will adjust the spacing apart of the tabs, thereby adjusting the spacing between stop faces 43, 44 thereon. Pin 39 can be held in its adjusted position either by set screws or by cementing. Even though the stop plate is tightly held down by screws 26 and 27, there is still enough flexibility at the tabs that the pin can make small adjustments in the spacing of stop faces 43 and 44.

A ring gear 45 having internal teeth 46 is fitted in the gear cavity so that its exterior periphery fits nicely in the rim and utilizes the rim as a bearing so that it rotates therein without substantial side play. The teeth extend inwardly to overlap the stop plate. A cover plate 47 closes the cavity and holds the ring gear therein. Within the ring gear and also fitted between the stop plate and the cover plate there is a spur gear 50. This spur gear is smaller than the internal opening in the ring gear. It has external teeth which are adapted to mesh with the internal teeth of the ring gear. There is a central hole 51 on the central axis of the spur gear which receives eccentric cam 18 so that rotation of the shaft eccentrically moves the spur gear inside the ring gear. The spur gear has a slot 52 at its edge which snugly fits over pin 37. The effect of this slotted pin engagement is to restrict the movement of the spur gear to an oscillatory one, full rotation of the spur gear being impossible. A boss 55 projects downwardly from the ring gear and rides in groove 30. It has a pair of stop faces 56, 57 which are respectively adapted to engage stop faces 44 and 43 of the tabs. Because the limitation of rotary movement is derived from contact between the boss and the tabs, it is evident that relative rotation must occur between the operative portions of the device to which they are functionally attached, namely, the input shaft and the casing. Because the input shaft is rotated to adjust the potentiometer, such relative rotation is most conveniently provided for by mounting the casing non-rotatively.

In order for the oscillatory movement of the spur gear to cause relative rotation of the ring gear and spur gear, it is necessary for the two to have different numbers of teeth. The teeth of both gears are the same size so they are adapted to fit each other, and are spaced apart so that there is no interference between them when the shaft is turned. In the preferred embodiment as shown in FIG. 1, the spur gear is provided with ten teeth, the ring gear is provided with eleven teeth. One complete oscillation of the spur gear is caused by one full revolution of shaft 15 and advances the ring gear by one tooth. In the embodiment shown, the stop and the boss each occupy the angular subtense of one full tooth. Therefore, ten oscillations of the spur gear resulting from ten rotations of the input shaft will advance the ring gear by ten teeth.

The total angular movement possible for the ring gear can be adjusted by spreading apart or moving closer together tabs 32 and 33. One means for carrying out this adjustment is by rotation of pin 39. Other means can readily be devised, such as a wedge in slot 34 or even the substitution of pins, with or without eccentrics, in the groove in place of the tabs. Whatever device is used, its effect is to place in the path of the boss on the ring gear, means for positively stopping rotation of the ring gear.

This device exists only to limit the total rotation of the shaft to a predetermined number of degrees. The interim condition of the potentiometer is not related to the gearing. Therefore this stop has no effect at all on the setting of the potentiometer while the shaft is turning. Therefore there is no reason for the gears to be made to any high degree of accuracy. There can be looseness of fit between them, backlash, and poor tolerances, which could not be tolerated in a device wherein the stop forms part of the potentiometer mechanism. The ultimate limitation on the shaft rotation is determined by the relationship, at the start of rotation, between stop faces 44 and 56 and, between stop faces 43 and 57. Regardless of how inexactly the gears are made, there will be, of course, a given gear relationship at these points. It is possible to make the gears to as high a precision as desired, but that only adds to the cost without improvement of function. This device thereby gives precise control with inexpensive components.

The device described provides a limit of ten turns, that is, 3600°. This can readily be held to tolerances of minus zero degrees, plus a few minutes of arc, which are very close tolerances, particularly for such a rugged device.

Other limits of rotation than ten turns can be obtained easily. In the example shown for ten turns, the ring gear has eleven teeth and the spur gear, ten. For five turns, the ring gear would have six teeth and the spur gear, five. Thus, generally, for N turns, the spur gear will have N teeth, and the ring gear will have N+1 teeth. To control the motion for part of a revolution, the spacing apart of stop faces 43 and 44 will be varied. For example, to achieve a turn limitation of ten turns plus ninety degrees, the two abutments together should take up three-fourths the angular subtense of one tooth on the ring gear. For ten turns minus ninety degrees of rotation, the two abutments should take up one and one-fourth times the angular subtense of one tooth on the ring gear.

This invention thus provides a rugged, convenient, inexpensive, simple to manufacture, turn limiting mechanism which exerts its limiting action to very close tolerances and with great strength, suitable for keeping excessive torque out of delicate instruments whose ultimate rotation it limits.

It will be recognized that this mechanism can be used to limit turns in connection with any device which includes a shaft, not merely with potentiometers.

This invention is not to be limited by the embodiments shown in the drawings and described in the description which are given by way of example and not of limitation, but only in accordance with the scope of the appended claims.

I claim:

1. A turn-limiting mechanism comprising: a case; a ring gear having a plurality of internal gear teeth and a central axis, said ring gear being journaled to the case for rotation around its own axis; a spur gear having a plurality of external gear teeth, the number of teeth on the two gears being different, the spur gear having a central axis and a radial slot, and being disposed within the ring gear, the central axes of the gears being spaced apart with the gear teeth engaged, the outer diameter of the spur gear teeth being enough less than the root diameter of the ring gear teeth that teeth of the two gears can successively engage without interference; a pin mounted to the case and projecting into the spur gear slot to limit the spur gear to oscillatory movement; an eccentric mounted to the case having a center of rotation coincident with the central axis of the ring gear, and an eccentric engagement with the spur gear coincident with the central axis of the spur gear, whereby rotation of the eccentric causes oscillatory movement of the spur gear, each oscillation turning the ring gear relative to the spur gear through an angle which is a function of the difference in number of teeth on the gears; and stop means comprising a stop plate attached to said case and having a radial slit at its outer edge, there being a tab formed thereby on each side of said slit, and adjustment means for adjustably spacing apart said tabs, said tabs being disposed on the periphery of the stop plate, the remainder of the periphery being radially inward from the tab, and in which the ring gear includes a boss, the tabs being disposed in the path of the boss for stopping its movement at extreme angular positions whereby spacing apart of the tabs by said adjustment means adjust the total angular movement available to the ring gear.

2. A turn-limiting mechanism according to claim 1 in which the adjustment means comprises an eccentric disposed in said slit.

3. A turn-limiting mechanism comprising: a case having a circular gear cavity; a ring gear having a plurality of internal gear teeth, a central axis, and a circular periphery closely fitting in the gear cavity so that the ring gear is journaled therein for rotation around its own axis; a spur gear having a plurality of external gear teeth, the number of teeth on the two gears being different, the spur gear having a central axis, a radial slot outward from its central axis, the spur gear being disposed within the ring gear, the central axes of the gears being spaced apart and their teeth engaged, the outer diameter of the spur gear teeth being enough less than the root diameter of the ring gear teeth that the teeth of the two gears can successively engage without interference; a pin mounted to the case and projecting into the cavity and into the spur gear slot to limit the spur gear to oscillatory movement; an eccentric comprising a shaft mounted to the case for rotation around the central axis of the ring gear and a circular eccentric cam on said shaft having its center displaced from said ring gear axis and coincident with the central axis of the spur gear, the spur gear having a central circular opening within which the circular eccentric closely fits for causing oscillatory movement of the spur gear; a stop plate mounted to the gear case within the cavity having a tab on its periphery, the remainder of its periphery being radially inward from the tab, the stop plate having a radial slit extending inwardly from its outer edge and through the tab thereby forming a tab on each side of the slit, and adjustment means for adjustably spacing apart said tabs; a boss on the ring gear, the tab being disposed in the path of the boss for stopping its movement at an extreme angular position, whereby rotation of the eccentric oscillates the spur gear within the ring gear, thereby causing the ring gear to rotate within the case, engagement of the boss with the tabs on the stop plate limiting an extreme angular position of the ring gear and thereby limiting rotation of the shaft, said adjustment means varying the effective width of the spacing apart of the two tabs in said path for limiting the total rotation available to the shaft.

4. A turn-limiting mechanism according to claim 3 in which the adjustment means are provided in the slit in the stop plate for adjustably spacing apart the tabs.

References Cited in the file of this patent
UNITED STATES PATENTS

| | | |
|---|---|---|
| 1,141,626 | Granville | June 1, 1915 |
| 1,939,030 | Wood | Dec. 12, 1933 |
| 1,942,794 | Benson | Jan. 9, 1934 |
| 2,151,534 | Scofield | Mar. 21, 1939 |
| 2,356,914 | Blancha | Aug. 29, 1944 |
| 2,658,395 | Coates | Nov. 10, 1953 |
| 2,903,893 | Scott et al. | Sept. 15, 1959 |